United States Patent [19]

Sasano

[11] Patent Number: 5,056,083
[45] Date of Patent: Oct. 8, 1991

[54] TELEPHONE APPARATUS AND A METHOD OF CONTROLLING SAME

[75] Inventor: Jun Sasano, Tokyo, Japan

[73] Assignee: Kabushiki Kaisha Toshiba, Kawasaki, Japan

[21] Appl. No.: 317,409

[22] Filed: Mar. 1, 1989

[30] Foreign Application Priority Data

Mar. 2, 1988 [JP] Japan .................................. 63-49207

[51] Int. Cl.$^5$ ............................................... H04J 3/12
[52] U.S. Cl. ................................ 370/110.1; 379/190; 379/194; 379/241
[58] Field of Search ...................... 370/110.1, 94.1, 60, 370/60.1, 94.2, 94.3; 379/387, 190, 194, 195, 241

[56] References Cited

U.S. PATENT DOCUMENTS

| | | | |
|---|---|---|---|
| 3,830,985 | 8/1974 | Troemel et al. | 379/190 |
| 4,079,201 | 3/1978 | Scott et al. | 379/387 |
| 4,856,055 | 8/1989 | Schwartz | 379/387 |
| 4,939,774 | 7/1990 | Sawada | 379/387 |

Primary Examiner—Douglas W. Olms
Assistant Examiner—Wellington Chin
Attorney, Agent, or Firm—Finnegan, Henderson, Farabow, Garrett, and Dunner

[57] ABSTRACT

This invention relates to a telephone apparatus and a method of controlling the telephone apparatus, wherein, where a calling operation conflicts with a call-receiving operation, calling processing and call-receiving processing are performed so that an intention of an operator at a calling side may be respected. A timer is caused to start to operate in response to an incoming signal detected by an incoming signal detecting unit. Where an off-hook operation is detected by an off-hook detecting unit before the expiration of a timer time set at the timer, a line control unit treats the off-hook operation as an off-hook operation for a calling operation. Where an off-hook operation is detected by the off-hook detecting unit after the expiration of the timer time, the line control unit treats the off-hook operation as an off-hook operation for a call-receiving operation.

14 Claims, 2 Drawing Sheets

TELEPHONE APPARATUS AND A METHOD OF CONTROLLING SAME

BACKGROUND OF THE INVENTION

1. Field of the Invention

This invention relates to telephone apparatuses connected to an Integrated Services Digital Network and methods of controlling same, more particularly, to apparatuses and methods of controlling same, wherein, if a calling operation conflicts with a call-receiving operation, an intention of an operator at a calling side is respected.

2. Description of the Related Art

In a telephone apparatus connected to a public subscriber line or to an Integrated Services Digital Network (hereinafter referred to as the ISDN), by responding to an incoming signal received from the line by an off-hook operation, a speech path is established through which speech is made possible.

In such telephone apparatus, a calling operation conflicts with a call-receiving operation in many occasions. Such conflict occurs, for example, where an incoming signal is received from another telephone apparatus immediately before the operator at the calling side (hereinafter referred to as the caller) conducts an off-hook operation for calling. Under such circumstance, in a conventional telephone apparatus, the off-hook operation is treated as a response to the incoming signal against the intention of the caller because the conventional telephone apparatus has no means for arbitrating such conflict.

For this reason, when the caller dials without recognizing the reception of the incoming signal, a dial tone is transmitted to the destination office, thus discomforting the operator at the destination office. On the other hand, the caller who has been preparing for calling is put into a speech state against his intention, and therefore the caller is also discomforted.

An object of the present invention is to provide a telephone apparatus connected to the ISDN and a method of controlling same, wherein calling processing and call-receiving processing are performed so that the intention of the caller may be respected.

SUMMARY OF THE INVENTION

In order to achieve the above object, the present invention provides a telephone apparatus comprising: incoming signal detecting means connected to an ISDN, for detecting an incoming signal sent from the ISDN; timer means which is caused to start to operate by an output of the incoming signal detecting means; off-hook detecting means for detecting an off-hook operation at the telephone apparatus; and control means for designating, where an incoming signal is detected by the incoming signal detecting means, calling processing in response to the off-hook operation conducted before the expiration of the period of time during which the timer means is operational and call-receiving processing in response to an off-hook operation conducted after the expiration of the timer time.

Further, the present invention provides a method of controlling a telephone apparatus connected to an ISDN, comprising: a step of detecting an incoming signal sent from the ISDN; a step of detecting an off-hook operation at the telephone apparatus; and a step of designating, where the reception of an incoming signal is detected, calling processing in response to an off-hook operation conducted before the expiration of a predetermined time and call-receiving processing in response to an off-hook operation conducted after the expiration of the predetermined time.

In the present invention, the off-hook operation conducted before the expiration of the period of time during which the timer means is operational is treated as an off-hook operation for a calling operation, and on the other hand, the off-hook operation conducted after the expiration of the period of time during which the timer means is operational is treated as an off-hook operation for a call-receiving operation.

In this case, since in the ISDN two channels are usable in one line and the line can be shared by a plurality of communication terminals connected thereto such as telephone sets, the incoming signal may be transferred to another communication terminal.

As described above, in the present invention, calling processing is performed in response to the off-hook operation conducted before the expiration of the timer time, and call-receiving processing is performed in response to the off-hook operation conducted after the expiration of the timer time so that the conflict between the calling and the call-receiving operations may be arbitrated. Therefore, the calling processing and call-receiving processing can be performed so that the intention of the caller may be respected.

DESCRIPTION OF THE PREFERRED EMBODIMENT

Figure 1:
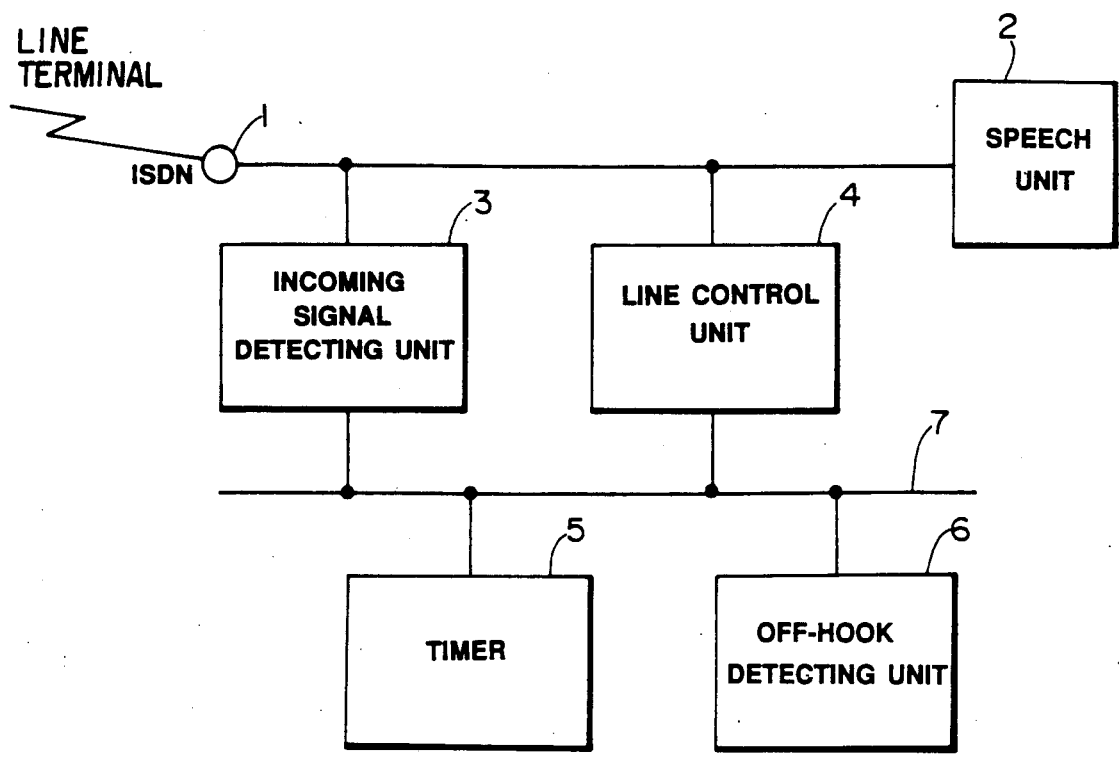
FIG. 1 is a block diagram showing an embodiment of the present invention.

An embodiment of the present invention will now be described in detail referring to the drawings.

FIG. 1 is a block diagram showing an embodiment of a telephone apparatus according to the present invention. A line terminal 1 is connected to an ISDN. As is well known, the ISDN is an integrated digital network capable of integrating service equipments having different characteristics such as a telephone set, a telex, a facsimile apparatus, etc., wherein one line has a plurality of channels. The line terminal 1 is connected to a speech unit 2, an incoming signal detecting unit 3 and a line control unit 4. The incoming signal detecting unit 3 and the line control unit 4 are connected through a bus line 7 to a timer 5 and an off-hook detecting unit 6.

The speech unit 2 performs a predetermined speech processing at the time of a speech through the ISDN. The speech unit 2 is connected to a handset (not shown) through which speech is made possible with the telephone apparatus at the destination office (not shown). The off-hook detecting unit 6 is used to detect an off-hook operation of the handset. When the unit 6 detects the off-hook operation, it transmits an off-hook detection signal to the line control unit 4.

The incoming signal detecting unit 3 is used to detect the reception of an incoming signal sent from the ISDN. When the incoming signal detecting unit 3 detects an incoming signal sent from the ISDN, the unit 3 transmits a signal indicative of the detection of the incoming signal to the line control unit 4 so as to inform the unit 4 of the reception of the incoming signal. The line control unit 4 is used to perform control operations on the line inclusive of operations of connecting and disconnecting the line to/from the ISDN. When the line control unit 4 detects an incoming signal sent from the ISDN, the unit 4 causes the timer 5 to start to operate. The timer 5 functions to prevent a conflict between the calling and the call-receiving operations according to the present invention. As will be described later, when the handset is caused to go off-hook and a calling operation is performed during the operation of the timer 5, that is, before the expiration of a timer time set at the timer 5, then no response is made to an incoming signal sent from the ISDN, and instead a calling processing is performed in response to the off-hook operation of the handset on a preferential basis. On the other hand, when the handset is caused to go off-hook after the expiration of the timer time, the off-hook operation is judged to be a response to the incoming signal sent from the ISDN and then a predetermined call-receiving processing is performed.

Figure 2:
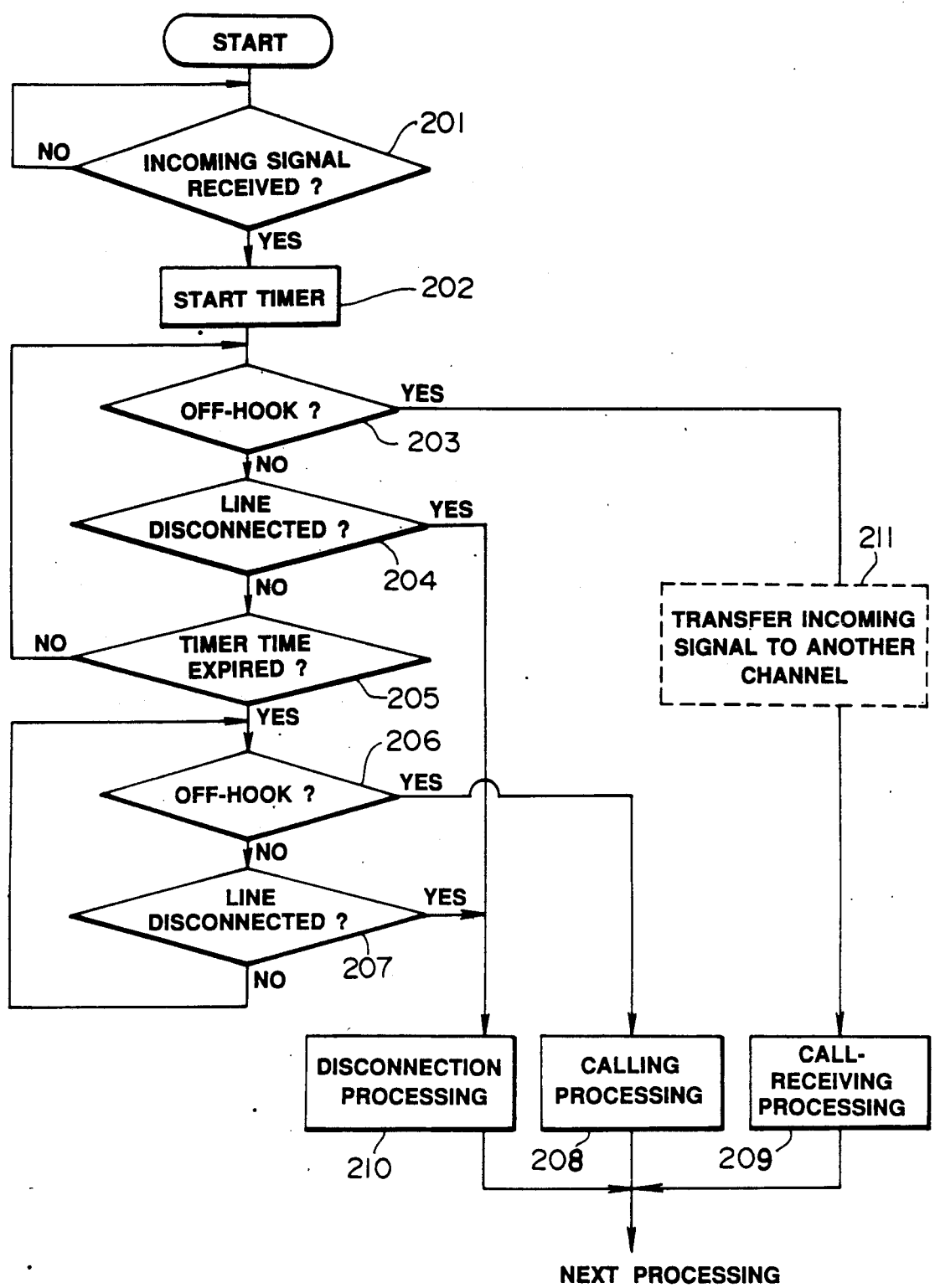
FIG. 2 is a flowchart illustrating the embodiment shown in FIG. 1.

FIG. 2 is a flowchart illustrating in detail processing performed at the line control unit 4 at the time when an incoming signal is received from the ISDN. When the line control unit 4 detects the reception of an incoming signal from the ISDN based on an incoming signal detection signal sent from the incoming signal detection unit 3 (step 201), the unit 4 causes the timer 5 to start to operate (step 202). After the timer 5 starts its operation, the line control unit 4 supervises by detecting a signal sent from the off-hook detecting unit 6 whether or not an off-hook operation for the calling operation or the call-receiving operation is conducted by the handset.

When it is detected by the off-hook detection signal sent from the off-hook detection unit 6 that the off-hook operation is conducted before the expiration of the period of time during which the timer means is operational, the line control unit 4 ignores the reception of the incoming signal and performs a calling processing (steps 203, 208).

In this case, since it is assumed that the caller has not recognized the reception of the incoming signal, it is judged that the handset is caused to go off-hook for the calling operation. Based on the judgment, no response is made to the incoming signal from the ISDN, and then a predetermined calling processing is performed based on the off-hook operation by the handset.

In this case, by taking advantage of the configuration that the ISDN has a plurality of channels, the incoming signal may be transferred to another channel. This transferring operation is shown in FIG. 2 as a step 211 designated by a dotted line.

Incidentally, when the off-hook operation of the handset is not conducted before the expiration of time set at the timer 5 and the line control unit 4 detects that the line is disconnected by the operator at the destination office, the unit 4 performs a predetermined line disconnection processing (steps 204, 205 and 210).

When the period of time during which the timer means is operational, as set at the timer 5, has expired, and an off-hook operation of the handset is conducted after the expiration of the period of time during which the timer means is operational, the off-hook detection unit 6 detects the off-hook operation of the handset, and the line control unit 4 detects the off-hook detection signal, then the line control unit 4 performs a predetermined call-receiving processing with respect to the incoming signal sent from the ISDN (steps 206, 209).

In this case, since it is assumed that the operator of the telephone apparatus is fully aware of the reception of the incoming signal sent from the ISDN, it is judged that the off-hook operation of the handset is made in response to the reception of the incoming signal. Based on this judgment, a predetermined call-receiving processing is performed.

Incidentally, where, after the expiration of the period of time during which the timer means is operational, the operator at the destination office disconnects the line before the handset is caused to go off-hook and where the line control unit 4 detects the disconnection of the line, the unit 4 performs a predetermined line disconnection processing (steps 207, 210).

Incidentally, the time set at the timer 5 is set to a predetermined length, for example, a time not longer than one second, or a time consumed from the reception of the incoming signal to the generation of a calling tone.

What is claimed is:

1. A telephone apparatus comprising:
   incoming signal detecting means connected with an Integrated Services Digital Network, for detecting reception of an incoming signal sent from the Integrated Services Digital Network;
   timer means which is caused to start to operate in response to the detection of an incoming signal supplied from the incoming signal detecting means; and
   off-hook detecting means for detecting an off-hook operation conducted at the telephone apparatus; and
   control means for initiating, when the reception of the incoming signal is detected, calling processing in response to the off-hook operation conducted before the expiration of a period of time during which the timer means is operational, and call-receiving processing in response to the off-hook operation conducted after the expiration of the period of time during which the timer means is operational.

2. A telephone apparatus according to claim 1, wherein the period of time the timer means is operational is set to a predetermined constant length.

3. A telephone apparatus according to claim 1, wherein the period of time during which the timer means is operational is set to a time consumed from the detection of the incoming signal to a generation of a calling tone.

4. A telephone apparatus according to claim 1 further comprising:
   disconnection detecting means for detecting disconnection of the line; and
   disconnection control means for performing a predetermined disconnection processing when reception of the incoming signal is detected by the incoming signal detecting means before or after the expiration of the period of time during which the timer means is operational.

5. A telephone apparatus comprising:
   a plurality of terminals connected with corresponding different channels of a line of an Integrated Services Digital Network;
   incoming signal detecting means connected with an Integrated Services Digital Network, for detecting reception of an incoming signal sent from the Integrated Services Digital Network;
   timer means which is caused to start to operate in response to the detection of the incoming signal supplied from the incoming signal detecting means;

off-hook detecting means for detecting an off-hook operation conducted at the telephone apparatus;

control means for initiating, when the reception of the incoming signal is detected, calling processing in response to the off-hook operation conducted before the expiration of a period of time during which the timer means is operational, and call-receiving processing in response to the off-hook operation conducted after the expiration of the period of time during which the timer means is operational; and transferring means for transferring the incoming signal to a terminal connected to another channel on the same line when calling processing is designated by the off-hook operation conducted before the expiration of the period of time during which the timer means is operational.

6. A telephone apparatus according to claim 5, wherein the period of time during which the timer means is operational is set to a predetermined constant length.

7. A telephone apparatus according to claim 5, wherein the period of time during which the timer means is operational is set to a time consumed from the detection of the incoming signal to a generation of a calling tone.

8. A telephone apparatus according to claim 5 further comprising:

disconnection detecting means for detecting disconnection of the line; and disconnection control means for performing predetermined disconnection processing when reception of the incoming signal is detected by the incoming signal detecting means before or after the expiration of the period of time during which the timer means is operational.

9. A method of controlling a telephone apparatus connected to an Integrated Services Digital Network, comprising the steps of:

detecting reception of an incoming signal sent form the Integrated Service Digital Network;

detecting an off-hook operation conducted at the telephone apparatus;

initiating operation of a timing means in response to detection of an incoming signal supplied from the incoming signal detecting means; and initiating, when the incoming signal is detected, a calling processing in response to the off-hook operation conducted before the expiration of a predetermined time and a call-receiving processing in response to the off-hook operation conducted after the expiration of the predetermined time.

10. A method according to claim 9, wherein a period of time the timer means is operational is set to a predetermined constant length.

11. A method according to claim 9, wherein a period of time the timer means is operational is set to a time consumed from the detection of the incoming signal to a generation of a calling tone.

12. A method according to claim 9 comprising the step of performing a predetermined disconnection processing when the incoming signal is detected and when disconnection of a line is detected before or after the expiration of a predetermined period of time.

13. A method of controlling a telephone apparatus having a plurality of terminals connected to corresponding different channels of a line connected to an Integrated Services Digital Network, comprising the steps of:

detecting reception of an incoming signal sent from the Integrated Service Digital Network;

detecting an off-hook operation conducted at the telephone apparatus;

initiating, when the incoming signal is detected, a calling processing in response to the off-hook operation conducted before the expiration of a predetermined time and a call-receiving processing in response to the off-hook operation conducted after the expiration of the predetermined time; and transferring an incoming signal to a terminal connected to another channel on the same line when calling processing is designated by an off-hook operation conducted before the expiration of the predetermined time.

14. A method according to claim 13 further comprising the step of performing a predetermined disconnection processing when the incoming signal is detected and when disconnection of a line is detected before or after the expiration of a predetermined period of time.

* * * * *